July 17, 1962
C. A. DEHNE
3,044,415
MECHANISM FOR PROPELLING A LOAD CARRYING VEHICLE
BETWEEN MAIN AND BRANCH LINES OF A
MATERIAL HANDLING SYSTEM
Filed July 27, 1960
2 Sheets-Sheet 1
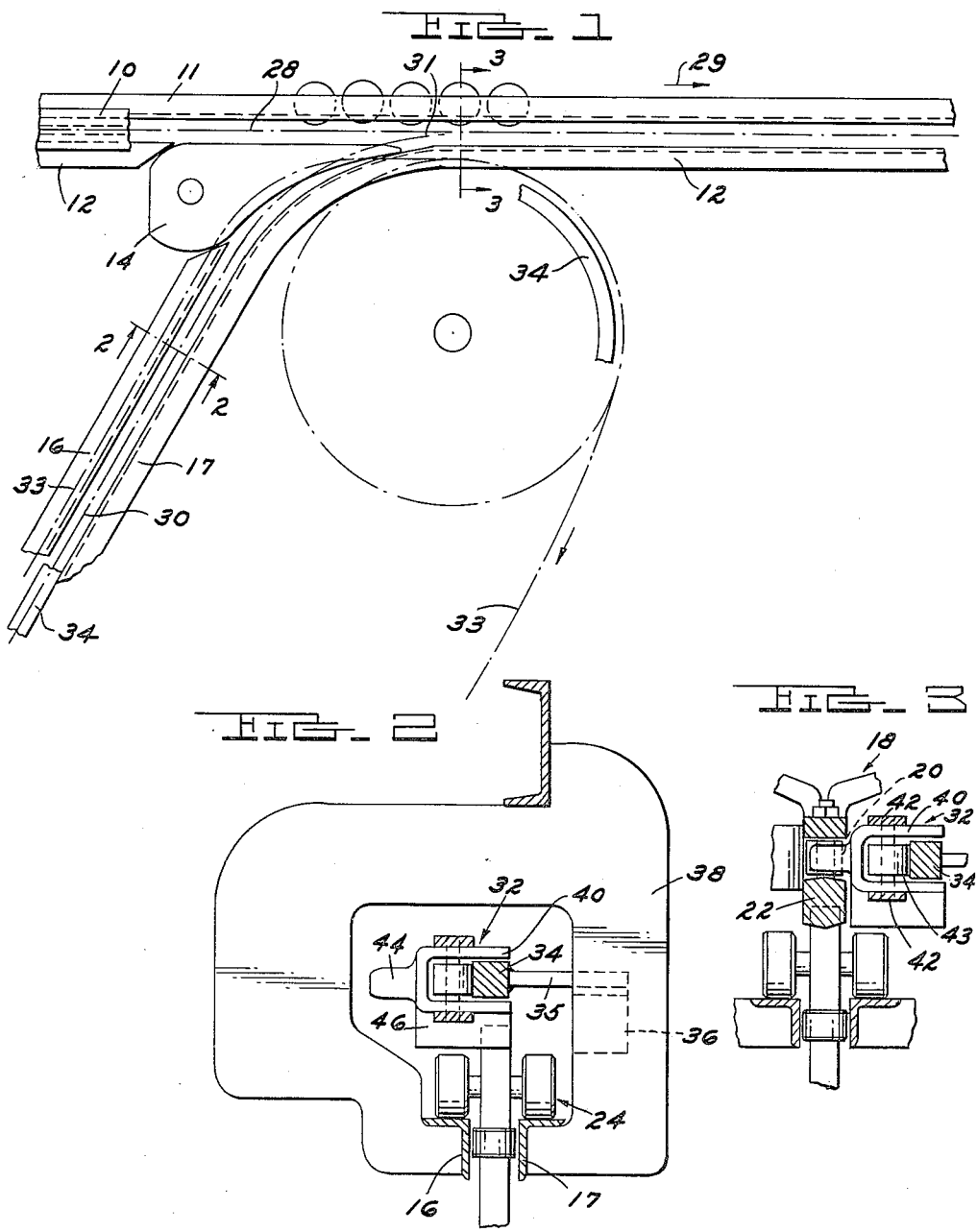
INVENTOR.
CLARENCE A. DEHNE
BY
Farley Forster & Farley
ATTORNEYS

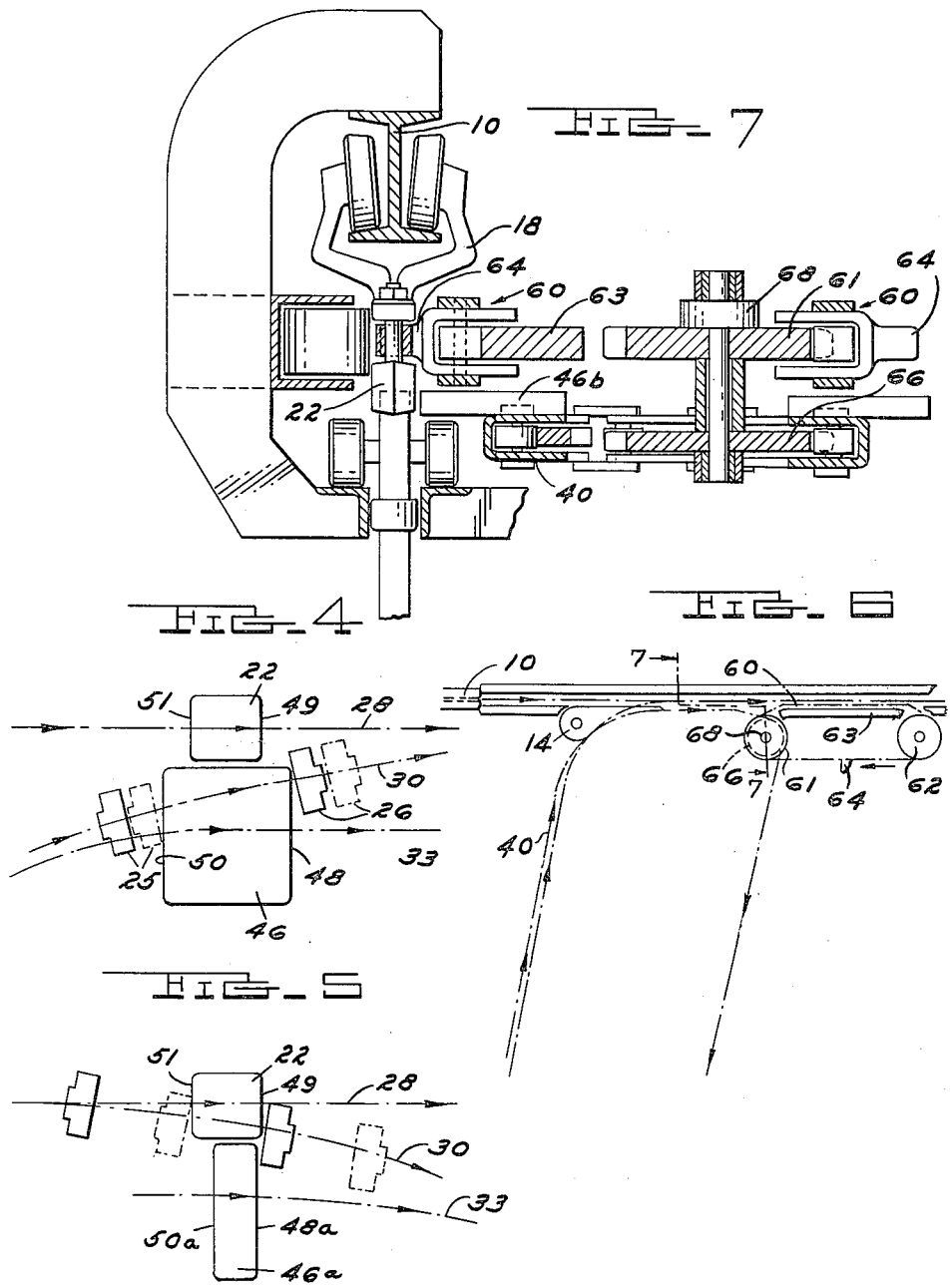

United States Patent Office 3,044,415
Patented July 17, 1962

3,044,415
MECHANISM FOR PROPELLING A LOAD CARRYING VEHICLE BETWEEN MAIN AND BRANCH LINES OF A MATERIAL HANDLING SYSTEM
Clarence A. Dehne, Garden City, Mich., assignor to Jervis B. Webb Company, Detroit, Mich., a corporation of Michigan
Filed July 27, 1960, Ser. No. 45,736
6 Claims. (Cl. 104—172)

This invention relates to an improved mechanism for transferring a load carrier under power between main and branch lines of a material handling system.

Systems in which the invention may be employed fall into two general types. One of these is the so-called "power and free" system in which load carrying trolleys are propelled along a main track by pusher members on an endless chain travelling adjacent the main track. Branch lines intersect the main track at switch points which may be arranged either to divert a trolley from the main track to a branch track—an exit switch—or to feed a trolley from a branch track to the main track—an entrance switch. The other type of material handling installation with which the invention may be used is one for propelling floor trucks which constitute the load carrying vehicle corresponding to the trolleys of a power and free installation. Floor truck drive lines may be either overhead or sub-floor, but in either case the floor truck is equipped with a driven member insertable into a guide slot which defines at least portions of the path of the truck travel. An endless propelling member is provided with spaced pushers which engage the driven member of the truck and propel it around a main line path of travel. Branch line paths of travel intersect the main line at switch points which may be either an exit or entrance type as before.

Many attempts have been made to drive the load carrying vehicle between main and branch lines by power as distinguished from other approaches which involve the use of some form of feeding device, with or without the assistance of gravity, which only partially propels the load carrying vehicle through the switch. Systems employing power employ an auxiliary chain or propelling member, which travels adjacent to at least that portion of the branch line at the switch, and is provided with some means for driving a load after it has been diverted from the main line or as it approaches the main line, depending upon whether the switch is of the exit or entrance type. Examples of such a use of an auxiliary chain in installations of the type mentioned are found in U.S. Patents Nos. 2,868,139 and 1,124,268, but commercial of these arrangements has been far from satisfactory. For example, at an entrance switch if the load is brought up to the main line under power and any condition arises which would produce a jam, great damage can result.

The present invention provides mechanism, including an auxiliary powered chain, which positively insures the passage of the load carrying vehicle smoothly and positively between main and branch lines and controlled at all times by a pusher member as distinguished from other systems where the load is released from the pusher member of one line and left uncontrolled until picked up by a pusher member of the other line. In the present invention the load is transferred directly from one pusher member to the other and at no time is it left out of control of either. With this arrangement, misfeeding can only result from improper timing such as a load being brought into the main line when there is no empty pusher there to receive it. Provision is made for this type of malfunction by an optional arrangement for driving the auxiliary chain through a device which will interrupt the drive in the event of any condition resulting in an excessive load, thereby at least minimizing any damage which might occur to the installation from a malfunction of any type.

Briefly, the present invention consists, in an installation of the type under discussion, of means for propelling a load through a switch point comprising an auxiliary propelling member or chain mounted for travel adjacent the branch line in a path which includes a portion extending parallel to and laterally spaced from the main line along the intersecting portion of the branch and main line. The auxiliary chain is provided with a series of pusher members mounted thereon at spaced intervals corresponding to the spacing between the pusher members of the main line propelling member and adapted to engage the driven member of the load. Means are provided for driving the auxiliary chain in synchronism with the main line chain so that a pusher member of the auxiliary chain travels in parallel side-by-side relation with a pusher member of the main chain along the portion where the two chains are travelling in parallel relation. A pusher member of the main line is thereby placed in position to receive the driven member of the load from a pusher member of the auxiliary chain or vice versa and in either event the receiving pusher member has its driving face located not in advance of the driving face of the delivering pusher member when moving along the parallel portion of the main and auxiliary lines. This permits the driving member of a trolley dog to move laterally, while travelling forwardly, from the driving face of the delivering pusher to the driving face of the receiving pusher, as the tracks intersect at the switch point.

The invention includes improved arrangements for driving the auxiliary chain directly from the main line, or alternately, driving it indirectly from the main line through an overload sensing device.

The positively controlled transfer under power accomplished by the invention permits loads to be transferred at greater speed, permits loads to be placed at closer center-to-center distances between successive loads and permits branch line intersections to be placed at closer spacing along the main line without possibility of malfunction due to loss of control of a load.

Representative constructional examples of the invention are disclosed in the accompanying drawings which consist of the following views:

FIGURE 1, a plan view, partly schematic, of an entrance intersection between branch and main lines of an overhead "power and free" system;

FIGURE 2, a sectional elevation of the branch line construction taken as indicated by the line 2—2 of FIG. 1;

FIGURE 3, a sectional elevation at the intersection of the main and branch lines taken as indicated by the line 3—3 of FIG. 1;

FIGURE 4, a schematic plan view showing the relation between the pusher members of the main and branch lines and the driven members of a load at an entrance type of intersection;

FIGURE 5, a schematic plan view similar to FIG. 4 but showing the relation between the driving and driven members at an exit type of intersection;

FIGURE 6, a schematic plan view showing an alternate form of drive for the auxiliary chain; and FIGURE 7, a sectional elevation at the intersection of main and branch lines taken substantially as indicated by the line 7—7 of FIG. 6.

Referring to FIGS. 1–3 a main power line track member 10 is mounted in the conventional manner above a pair of main line load supporting tracks or rails 11 and 12, track 12 being broken for the installation of a switch tongue 14 and resuming after being joined by one of a pair of branch line load supporting track rails 16 and 17. A series of conventional trolleys 18 (FIG. 7) travel on the main track 10, are connected to links of an endless propelling chain 20, certain of which are provided with spaced depending pusher members 22. Load carrying trolleys 24 travel on the tracks 11 and 12 below the pusher members 22 and are each provided with a pair of upwardly projecting one-way pivoting dogs 25 and 26. The foregoing arrangement is conventional and is illustrated in detail for example in U.S. Patent 2,485,215 or 2,868,139.

FIGURE 1 shows an entrance switch arrangement—that is, one where a load trolley supported on the branch tracks 16 and 17 is to be fed onto the main track. The path of travel of the main propelling chain and pusher members is indicated by the broken line 28, the direction of travel on the main line by the arrow 29. On the branch line, the path of travel of the load carrying trolley is indicated by the broken line 30 which intersects the path of main line travel 28 at 31.

An auxiliary chain 32 (FIGS. 2 and 3) is mounted adjacent the branch line for traveling a path indicated by the broken line 33, this path being defined by a back-up bar 34 suitably supported by members 35 secured to brackets 36 carried by the track supporting yokes 38 such as shown in FIG. 2. The path of travel so defined includes a portion (in advance of the section line for FIG. 3 on FIG. 1) which extends parallel to the path of travel of the main track and main propelling chain, this portion extending from a point in advance of the intersection 31 between the main and branch tracks. In other words, this parallel portion of the path of travel of the auxiliary propelling chain extends through the switch zone.

The auxiliary propelling chain 32 consists of alternate U-shaped links 40 pivotally connected to alternate pairs of side links 42 with a roller 43 on each pivotal connection. The U-shaped links 40 act as rider plates in engaging the back-up bar 34. Projecting from the base of the U-shaped link 40 is a driving dog 44 (FIG. 2) which is brought into driven relation with the main chain between the side links thereof. Depending from certain of the U-shaped links 40 is a pusher member 46 which engages between the driven members or dogs 25 and 26 of a trolley 24 and which in plan is proportioned as shown in either FIG. 4 or FIG. 5 depending upon whether the auxiliary chain is installed at an entrance or exit switch.

This series of the pusher members 46 are installed on the auxiliary chain with a spacing corresponding to the spacing between the series of pushers 22 on the main chain. For an entrance switch, as shown in FIG. 4, a pusher dog 46 of the auxiliary chain is delivering a trolley to a pusher dog 22 of the main chain which is the receiving member, and synchronism between the two chains is such that as the two pusher members 22 and 46 travel along the portions of their paths of travel which are parallel at the switch zone, the driving face 48 of the delivering pusher 46 which engages the leading or driven member 26 of the trolley, lies in advance of the driving face 49 of the receiving pusher 22. The trailing face 50 of the delivering pusher 46 lies to the rear of the trailing face 51 of the receiving pusher 22 and serves to confine any overtravel of the trolley to the phantom position shown for its dogs 25 and 26. In other words, the location of the driving face 49 of the receiving pusher is not in advance of the driving face 48 of the delivering pusher 46, while the trailing face 50 of the delivering pusher 46 is not in advance of the trailing face 51 of the receiving pusher 22. The receiving member has a width in the direction of travel which is less than that of the delivering pusher member.

These same relations apply for an exit switch as shown in FIG. 5. Pusher 22 of the main line, which is the delivering member, has a width in the direction of travel which exceeds that of the receiving pusher member 46a, and the driving face 48a of the receiving pusher member 46a lies not in advance of the driving face 49 of the delivering pusher member 22. Likewise the trailing face 51 lies to the rear or not in advance of the trailing face 50a.

Hence for either an entrance or an exit switch zone the driven member 25 of the trolley moves laterally from the delivering pusher member to the receiving pusher member at all times under the positive control of one or the other with no possibility of jamming.

It is to be noted that the pusher members of the auxiliary chain are formed with a dimension transverse to the direction of travel which is in excess of the width of the driven members of the trolleys so as to permit the branch track and auxiliary propelling member to follow different paths through the switch zone. In the case of an entrance switch, the auxiliary propelling member follows a path which brings it into parallel relation with the main propelling member and main track in advance of the intersection of the branch track with the latter; conversely, in the case of an exit switch, the path of travel of the auxiliary propelling member extends parallel to the path of travel of the main propelling member and main track beyond the point of divergence of the branch track with the latter. These relationships are apparent from a comparison of the paths of travel of the main propelling member and track 28, the branch track 30 and the auxiliary propelling member 33, all as shown in FIG. 4 for an entrance condition and FIG. 5 for an exit condition.

As further insurance against the possibility of malfunction, the driving arrangement for the auxiliary propelling member shown in FIGS. 6 and 7 may be employed. This consists of a power takeoff device in the form of an endless chain 60, trained about a pair of sprockets 61 and 62 and a back-up member 63, and provided with dogs 64 for driving engagement with the main chain.

The auxiliary propelling chain is trained about a sprocket 66 driven from the sprocket 61 through a conventional overload cutout device 68 of suitable type which serves to interrupt the drive between the sprockets 61 and 66, and preferably also actuates electrical means for stopping the main line, in the event the load on the auxiliary propelling chain becomes excessive. In simplest form this overload cutout device would be a conventional shear-pin; in preferred form, a device of the type shown in U.S. Patent 1,938,720 or 2,052,152 would be employed so as to obtain a signal for shutting down the main line drive. The auxiliary propelling chain is similar in construction to that previously described except that the pusher members 46b project outwardly rather than downwardly from the U-shaped links 40 thereof.

The principles of operation incorporated in the construction disclosed and described, which are particularly designed for use in a conventional overhead "power and free" system, will be appreciated by those skilled in the art to be equally applicable to a floor truck drive line system. The only difference between the two types of system is that usually in the floor truck drive line type, the arrangement between the pusher and driven members is the reverse of that shown herein in the sense that a pair of spaced pusher members are mounted on the propelling members, main and auxiliary, for driving a single driven member on the load carrying vehicle. The functioning and advantages of the invention are equally obtainable however, it merely being necessary to observe the essential relation of maintaining the driving face of the receiving pusher member to the rear or not in advance of the driving face of the delivering pusher member as the two members pass through the switch point in side-by-side relation.

While preferred embodiments have been described above in detail, it will be understood that numerous modi-

I claim:

1. A material handling system of the type wherein a load carrying vehicle is adapted to be propelled along a main line path of travel by engagement of a driven member on such vehicle by one of a series of spaced pusher members carried by an endless main propelling member travelling parallel to said main line path of travel, said system further including means which define a branch line path of travel intersecting said main path of travel at a switch zone; characterized by means for propelling said load carrying vehicle between main and branch lines through said switch zone comprising an auxiliary endless propelling member, means mounting said auxiliary propelling member adjacent said branch line for travel in a path which includes a portion extending parallel to and laterally spaced from the path of travel of said main propelling member through said switch zone, a second series of pusher members mounted on said auxiliary propelling member in spaced relation corresponding to the spacing between said main pusher members, means for driving said auxiliary propelling member in synchronism with said main propelling member so that the pusher members carried by each of said propelling members travel abreast in laterally spaced side-by-side relation along the portions of the paths of travel of said main and auxiliary propelling members which are parallel, the pusher members of each of said series each having a driving face, a pusher member of one of said series being adapted to receive a load carrying vehicle driven member from a delivering pusher member of the other of said series at said switch zone, the said driving face of said receiving pusher member being located not in advance of the driving face of said delivering pusher member when moving along the said parallel portions of said main and auxiliary propelling members, and said driven member having a width transversely of the direction of travel which exceeds the said lateral spacing between said pusher members whereby said driven member is transferred from a delivering pusher member to a receiving pusher member travelling abreast thereto.

2. A material handling system of the type defined in claim 1 wherein said load carrying vehicle is of the type having a pair of dogs spaced apart in the direction of travel, one of said dogs forming said driven member and said pair of dogs being adapted to trap a pusher member therebetween, each pusher member of both of said series of pusher members having a pair of dog engaging faces, the said dog engaging faces of said delivering pusher member being spaced apart in the direction of travel a distance greater than the said dog engaging faces of said receiving pusher.

3. A material handling system according to claim 1 wherein said means for driving said auxiliary propelling member comprises a series of driving dogs mounted on said auxiliary propelling member in laterally and vertically spaced relation with the said second series of pusher members mounted thereon.

4. A material handling system according to claim 1 wherein said switch zone is one where a load carrying vehicle enters said main line from said branch line, said auxiliary propelling member mounting means defining a path of travel which extends into parallel relation with said main line in advance of said entrance switch zone with relation to the normal direction of travel of a load carrying vehicle therethrough.

5. A material handling system according to claim 1 wherein said switch point defines an exit of a load carrying vehicle from said main line into said branch line, said auxiliary propelling member mounting means defining a path of travel which extends in parallel relation to said main line beyond said exit switch point.

6. A material handling system according to claim 1 wherein said means for driving said auxiliary propelling member comprises a power takeoff device continuously driven by said main propelling member and mechanism for driving said auxiliary propelling member from said power takeoff device, said mechanism including means for interrupting drive to said auxiliary propelling member in response to an excessive load thereon.

References Cited in the file of this patent

UNITED STATES PATENTS

| | | |
|---|---|---|
| 1,124,268 | Bernheim | Jan. 12, 1915 |
| 2,868,139 | Klamp | Jan. 13, 1959 |
| 2,875,704 | Yates | Mar. 3, 1959 |
| 2,949,862 | Klamp | Apr. 23, 1960 |
| 2,965,043 | Klamp et al. | Dec. 20, 1960 |

UNITED STATES PATENT OFFICE
CERTIFICATE OF CORRECTION

July 17, 1962

Patent No. 3,044,415

Clarence A. Dehne

It is hereby certified that error appears in the above numbered patent requiring correction and that the said Letters Patent should read as corrected below.

Column 1, lines 51 and 52, after "commercial" insert -- use --; column 6, lines 23 and 27, for "point", each occurrence, read -- zone --; same column 6, line 24, for "into" read -- onto --.

Signed and sealed this 30th day of October 1962.

(SEAL)
Attest:

ERNEST W. SWIDER
Attesting Officer

DAVID L. LADD
Commissioner of Patents